United States Patent [19]

Gutman

[11] 4,198,090
[45] Apr. 15, 1980

[54] SHOVEL

[76] Inventor: David Gutman, 447 Mercy St., Philadelphia, Pa. 19108

[21] Appl. No.: 937,855

[22] Filed: Aug. 29, 1978

[51] Int. Cl.² ............................ A01B 1/22; B25G 1/04
[52] U.S. Cl. .................................. 294/58; 254/131.5; 294/59
[58] Field of Search ...................... 294/51, 54, 57–59; 37/53, 130; 254/131.5, 132

[56] References Cited

U.S. PATENT DOCUMENTS

| 568,962 | 10/1896 | Skeels | 254/131.5 |
| 2,520,606 | 8/1950 | McLoughlin | 37/53 X |
| 2,769,612 | 11/1956 | Weisheit | 294/59 UX |
| 3,155,414 | 11/1964 | Bales | 294/58 |

FOREIGN PATENT DOCUMENTS

| 676597 | 6/1939 | Fed. Rep. of Germany | 294/58 |
| 808505 | 7/1951 | Fed. Rep. of Germany | 294/59 |
| 1035983 | 9/1953 | France | 254/131.5 |
| 1218377 | 5/1960 | France | 294/59 |
| 124360 | 3/1919 | United Kingdom | 294/59 |

Primary Examiner—Johnny D. Cherry
Attorney, Agent, or Firm—Morton J. Rosenberg

[57] ABSTRACT

An improved shovel (10) which includes the standard longitudinally extending handle member (12) having a scoop member (14) and a gripping member (16) rigidly secured on opposing longitudinally displaced end sections. The shovel (10) includes an adjustable lever mechanism (30) which is releasably secured and movably displaceable in a direction substantially normal to a longitudinal direction (20) in relation to handle member (12). Adjustable lever mechanism (30) is adapted to interface at a fulcrum point (38) with a base surface (18) to rotationally activate scoop member (14) when material is to be removed from base surface (18). An adjustable grip mechanism (50) is releasably secured and movably displaceable with respect to the handle member (12) and extends above the handle member (12) for providing a secondary gripping portion for a user.

9 Claims, 3 Drawing Figures

U.S. Patent  Apr. 15, 1980  4,198,090
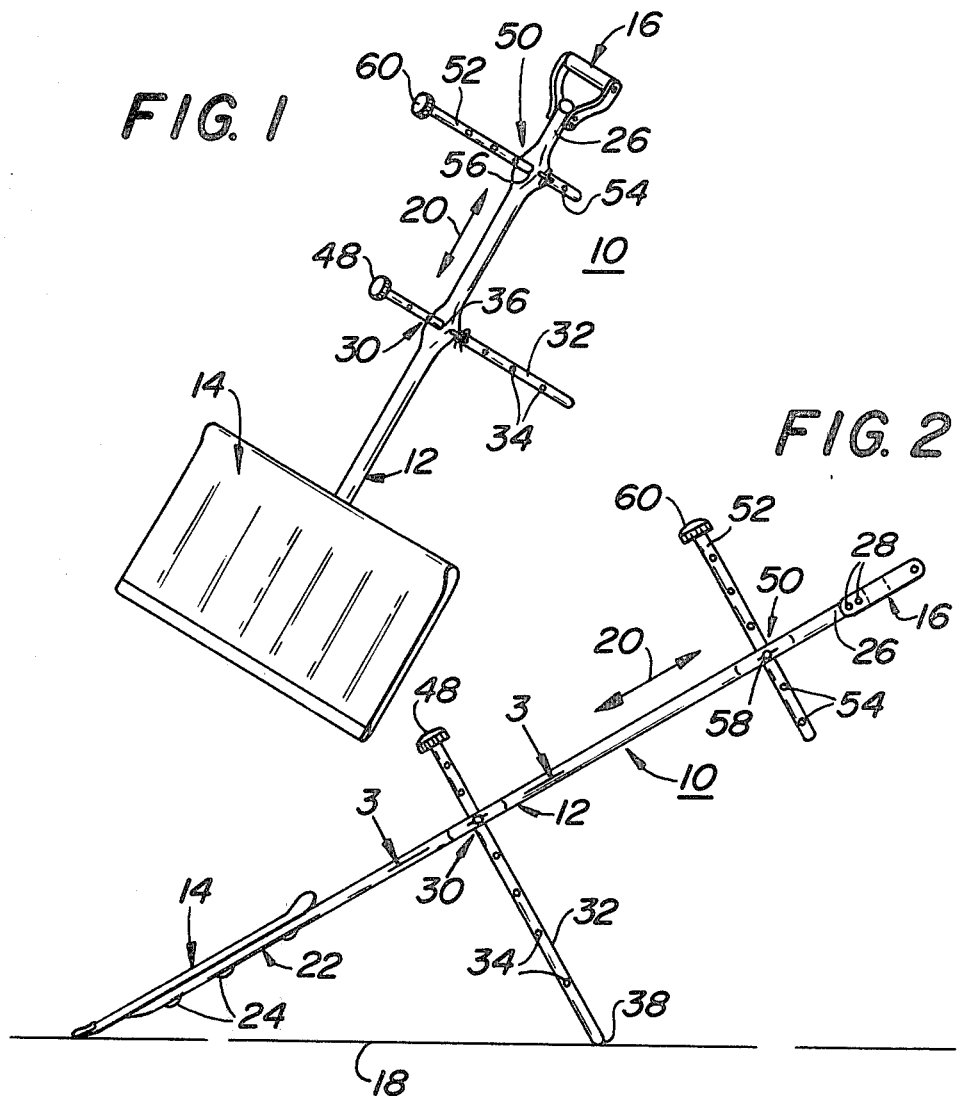

SHOVEL

BACKGROUND OF THE INVENTION

1. Field of the Invention

This invention pertains to tool mechanisms. In particular, this invention is directed to shovels. Still further, this invention is directed to an improvement in shovels, whereby rotational actuation of a scoop member is aided in removing material from a base surface. Further, this invention is directed to a shovel which is fulcrumed at a particular point in order to optimize removal of waste materials from a base surface. Still further, this invention is directed to a shovel which is provided with an adjustable secondary gripping portion to aid the user in removal of material.

2. Prior Art

Shovels utilizing fulcrum type aids are known in the art. The best prior art known to applicant is found in U.S. Pat. Nos. 240,650; 738,057; 462,918; 418,656; 1,945,430; 3,035,816; 1,194,197; and, 3,113,758. In some of these references, an arcuate member is provided as a rocker upon which the prior art shovel rests and is sustained when the shovel is moved forward or rearward. Such members may act as a lever type element to allow the shovel to be movably displaced. However, such prior art references do not provide adjustability in removal of waste materials dependent upon parameters, such as relating to both the material to be displaced and parameters associated with the user physical characteristics.

In other prior art references, there are shown attachments which may act as a fulcrum for aiding the user. However, such generally do not utilize an adjustable type fulcrum member in combination with an adjustable hand gripping member for purposes of easing the displacement of material to be removed.

In other prior art references, a plurality of handles are utilized at varying angles to the extended handle member. However, such prior art references do not provide for the particular location and adjustability as is found in the subject invention concept, when taken in combination with the adjustable fulcrum mechanism.

SUMMARY OF THE INVENTION

A shovel which includes a longitudinally extended handle member. The shovel has a scoop member fixedly secured to a first end of the handle member and a gripping member is fixedly secured to a second end of the handle member. The shovel further includes an adjustable lever mechanism which is releasably secured to the extended handle member for providing an adjustable height above a base surface, when the scoop member is in contact with the base surface. The shovel further includes an adjustable grip mechanism releasably secured to the extended handle member. The adjustable grip mechanism extends above the handle member for providing a secondary gripping portion for a user.

BRIEF DESCRIPTION OF THE DRAWINGS

FIG. 1 is a perspective view of the shovel member showing both the adjustable lever mechanism and the adjustable grip mechanism of the invention concept;

FIG. 2 is a side view of the shovel as shown in FIG. 1; and,

FIG. 3 is a sectional view partially cut-away of the adjustable lever mechanism taken along the section line 3—3 of FIG. 2.

DESCRIPTION OF THE PREFERRED EMBODIMENTS

Referring now to FIGS. 1-3, there is shown shovel 10 for removing material from base surface 18. In particular, shovel 10 is provided for maximizing the leverage that a user may need in removing large quantities of material from base surface 18. Such uses include snow removal or other types of material which, due to their weight and possible cohesiveness with surrounding material, would cause difficulties in lifting such material from base surface 18. Additionally, as will be seen in following paragraphs, when removing such material from any base surface 18, there is needed an additional gripping portion for shovel 10, which is provided by the subject invention concept. Due to the fact that the lifting exertion is highly dependent on parameters such as weight of material to be removed and the physical aspects of a particular user, adjustability of the lever height is of maximum importance in shovel 10.

As shown in FIGS. 1 and 2, shovel 10 includes a standard handle member 12 which extends in longitudinal direction 20 in the well-known manner of such shovels. Shovel 10 further includes scoop member 14 fixedly secured to first end 22 of handle member 12. Fixed securement of scoop member 14 to handle member 12 may be through bolts 24 or some like securement mechanism not important to the inventive concept of the subject invention. Shovel 10 further includes gripping member 16 fixedly secured to second end 26 of handle member 12. Fixed securement of gripping member 16 to handle member second end 26 may be through screws 28, bolts, or some like fixed securement mechanism not important to the inventive concept as is herein defined, with the exception that gripping member 16 be secured in a rigid fashion to handle member 12 in order that there be no relative movement between the elements.

Shovel 10 includes adjustable lever means 30 which is releasably secured to extended handle member 12 for providing an adjustable lever height above base surface 18 when scoop member 14 is contiguous with and in contact with base surface 18.

Adjustable lever means 30 includes lever member 32 and passes through handle member 12 as is shown. Lever member 32 when positionally located in usable fashion with respect to handle member 12 extends in a substantially normal direction to longitudinal direction 20 defined by the extended length of handle member 12. Lever member 32 includes a multiplicity or plurality of lever openings 34, each displaced from the other and extending in the direction defined by the extension of lever member 32. Thus, as will be seen in following paragraphs, lever member 32 is releasably securable to handle member 12 at a plurality of positional locations on lever member 32.

Lever member 32 defines an extended lever rod member with the plurality of lever openings 34 passing therethrough. Lever openings 34 are alignable with first handle opening 36, clearly seen in FIG. 3. Lever openings 34 are alignable with first handle opening 36 passing through handle member 12. In this manner, the positional height of a predetermined point on handle member 12 may be varied and adjusted above base surface 18.

As can be seen from FIG. 2, shovel 10 has fulcrum point 38 at a point contiguous with base surface 18. In this manner, scoop member 14 may be rotationally displaced in an upward manner around fulcrum point 38 by a downward force on gripping member 16. The optimal height above base surface 18 may be empirically derived by a user and appropriate lever opening 34 may be aligned with first handle opening 36, as required by the particular user and material removal parameters necessary.

Adjustable lever means 30 further includes lever rod mounting mechanism 40, clearly shown in FIG. 3. Lever rod mounting mechanism allows for releasable coupling of handle member 12 to extended lever rod member 32 when first handle opening 36 is aligned with one of lever openings 34. As shown in FIG. 3, lever rod mounting mechanism 40 may include mounting rod 42 having a diameter substantially less than first handle opening 36 and each of lever openings 34 in order to allow passage therethrough. Mounting rod 42 has head member 44 of an extended diameter greater than first handle opening 36 in order to block passage therethrough. Rod hook 46, having a transverse direction greater than first handle opening 36, may be inserted through an opening in mounting rod 42 in order to provide reversible blocking in any escapement path that lever rod mounting mechanism 40 may take. In this manner, there is shown a cotter-like lever rod mounting mechanism 40 to provide restrainment between lever member 32 and handle member 12.

When the user wishes to adjust or readjust the height of lever member 32 with respect to handle member 12, hook member 46 is removed from mounting rod 42 and mounting rod 42 is displaced from insert through first handle opening 36 and the particular lever opening 34 being utilized. The user then adjusts first handle opening 36 with another lever opening 34 and reinserts mounting rod 42 and further couples hook member 46 to mounting rod 42 to provide for a new adjustment position.

Adjustable lever mechanism 30 further includes lever knob member 48 secured to an upper end of lever rod member 32, to aid the user in rotationally displacing scoop member 14. Lever knob 48 is fixedly secured to lever member 32 through bolts, screws, formed in one piece formation therewith, or in some like technique, not important to the inventive concept as is herein described, with the exception that lever knob member 48 provide the user with a stable hand grip for utilization purposes, as has hereinbefore been described.

Shovel 10 further includes adjustable grip mechanism 50 which is releasably secured to extended handle member 12 as is shown in FIGS. 1 and 2. Adjustable grip mechanism 50 extends above handle member 12 for providing a secondary gripping position for the user in order to aid in removal of material from base surface 18.

Adjustable grip mechanism 50 includes extended grip member 52, operationally positioned in a direction substantially normal to the longitudinal extension direction 20 of handle member 12. Extended grip member 52 is longitudinally displaced from adjustable lever mechanism 30, as is clearly seen in FIGS. 1 and 2. As in the case of adjustable lever mechanism 30, extended grip member 52 is releasably secured to handle member 14 at a plurality of positional locations on grip member 52.

Extended grip member 52 defines an extended grip rod member, having a plurality of grip openings 54 positionally located in the direction substantially normal to longitudinal direction 20. Each of grip openings 54 are displaced from a next successive opening formed through grip rod member 52. As has hereinbefore been described for adjustable lever mechanism 30, grip openings 54 are alignable with second handle opening 56 passing through handle member 12.

Adjustable grip mechanism 50 includes grip rod mounting mechanism 58 for releasably coupling handle member 12 to extended grip rod member 52 when second handle opening 56 is aligned witth one of grip openings 54. Grip rod mounting mechanism 58 is essentially the same type of lever rod mounting mechanism 40 in the form of a cotter pin arrangement, previously described for mechanism 40 and further shown for mechanism 40 in FIG. 3.

Adjustable grip mechanism 50 further includes grip knob member 60 secured to one end of extended grip member 52 for aiding the user in lifting shovel 10 above base surface 18.

In this manner, shovel 10 may be inserted into material to be removed and fulcrumed about point 38 in a rotational activation of scoop member 14. During this operation, the user may grasp grip rod knob member 60 to aid in removal purposes and further subsequent to the rotational activation of scoop member 14, the user may utilize a combination of the gripping action on gripping member 16 and knob member 60 for further removal purposes.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or the scope of the invention as defined in the appended claims.

What is claimed is:

1. A shovel including a longitudinally extended handle member, said shovel having a scoop member fixedly secured to a first end of said handle member and a gripping member fixedly secured to a second end of said handle member, wherein the improvement comprises:
   (a) adjustable lever means releasably secured to said extended handle member for providing an adjustable lever height above a base surface when said scoop member is in contact with said base surface, said lever means including a lever member passing through said handle member and being releasably securable thereto at a plurality of positional locations on said lever member; and,
   (b) adjustable grip means releasably secured to said extended handle member, said adjustable grip means extending above said handle member for providing a secondary gripping portion for a user.

2. The shovel as recited in claim 1 where said adjustable lever means includes an extended lever rod member having a plurality of lever openings passing therethrough, each of said lever openings being displaced from a next successive opening, said lever openings being alignable with a first handle opening passing through said handle member.

3. The shovel as recited in claim 2 where said adjustable lever means includes lever rod mounting means for releasably coupling said handle member to said extended lever rod member when said first handle opening is aligned with one of said lever openings.

4. The shovel as recited in claim 3 where said lever rod mounting means includes cotter pin means for releasably securing said handle member to said extended lever rod member.

5. The shovel as recited in claim 4 where said adjustable lever means includes a lever knob member secured to one end of said lever rod member for aiding said user in rotationally displacing said scoop member.

6. The shovel as recited in claim 1 where said adjustable grip means includes an extended grip member passing through said handle member, said extended grip member being longitudinally displaced from said adjustable lever means, said extended grip member being releasably securable to said handle member at a plurality of positional locations on said grip member.

7. The shovel as recited in claim 6 where said adjustable grip means includes an extended grip rod member having a plurality of grip openings passing therethrough, each of said grip openings being displaced from a next successive opening formed through said grip rod member, said grip openings being alignable with a second handle opening passing through said handle member.

8. The shovel as recited in claim 7 where said adjustable grip means includes grip rod mounting means for releasably coupling said handle member to said extended grip rod member when said second handle opening is aligned with one of said grip openings.

9. The shovel as recited in claim 8 where said adjustable grip means includes a grip knob member secured to one end of said grip rod members for aiding said user in lifting said shovel above said base surface.

* * * * *